United States Patent Office 2,874,491
Patented Feb. 24, 1959

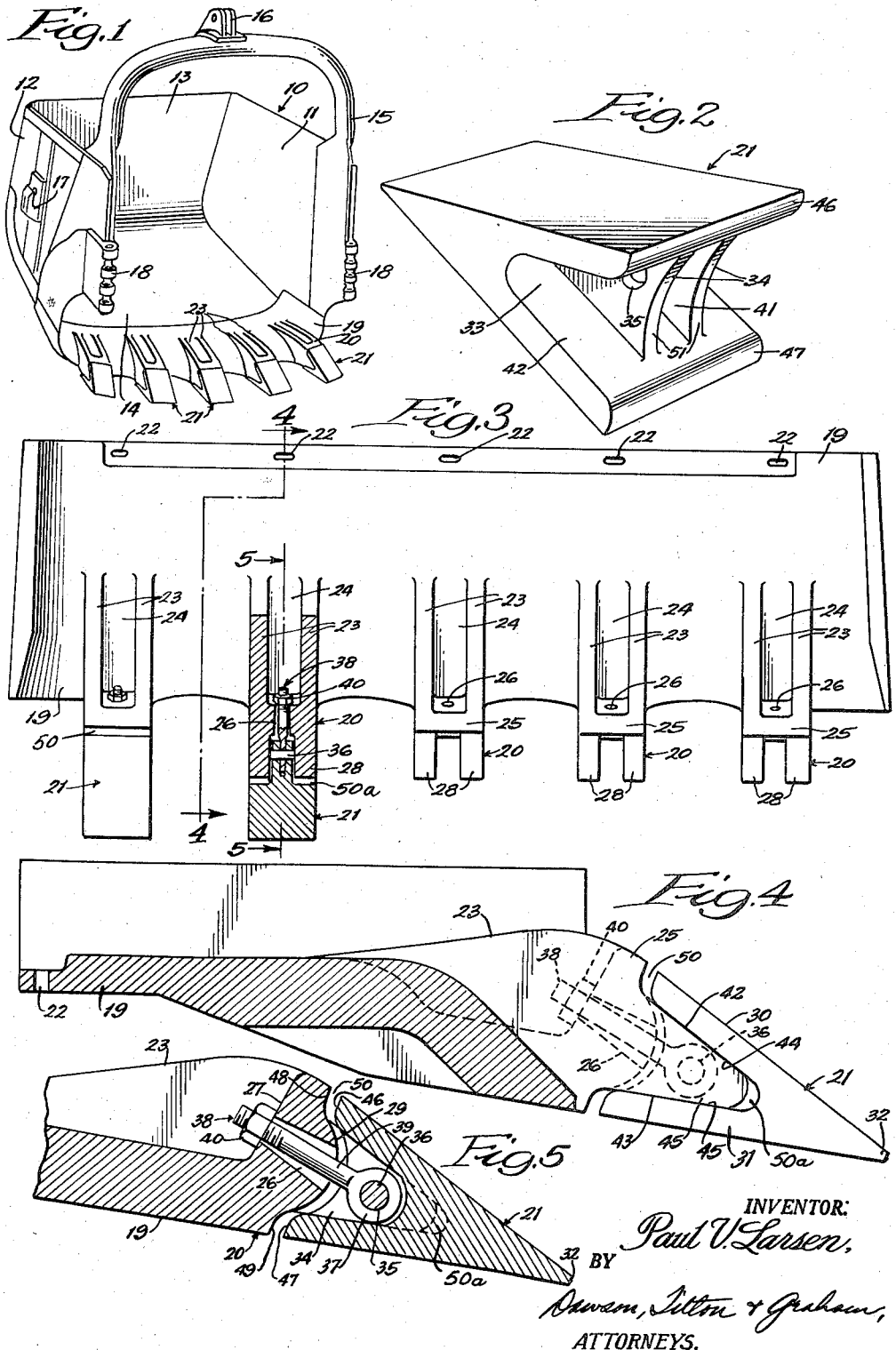

2,874,491

BUCKET TOOTH ASSEMBLY

Paul V. Larsen, Portland, Oreg., assignor, by mesne assignments, to Electric Steel Foundry Company, a corporation of Oregon Application December 31, 1953, Serial No. 401,481

5 Claims. (Cl. 37—142)

This invention relates to a bucket tooth assembly and, more particularly, to a tooth and mounting means for dragline buckets, dippers, back hoes, and the like.

Some types of teeth or points used in dragline buckets and the like normally provide a shank which is used in mounting the tooth on the horn or mounting member but which adds considerably to the dead weight of the tooth. Further, the customary type of tooth and mounting generally utilize a key and slot arrangement, and a good fit and rather close tolerance are required in order that the members fit properly which adds considerably to the cost of the tooth assembly. Moreover, the rough usage to which the tooth is subjected in the use of dragline buckets, etc., results in considerable wear, and take-up of the tooth upon its mounting to compensate for such wear has been, for the most part, troublesome and expensive to maintain.

It is an object of this invention to provide a tooth and mounting means therefor for use with dragline buckets and the like that overcomes the disadvantages in prior art structures, particularly the disadvantages set out above. Another object of the invention is to provide a tooth and mounting therefor wherein the initial anchoring of the tooth in position is quickly and easily accomplished and wherein close manufacturing tolerances are not required in the forming of the tooth and mounting in order that a near perfect anchoring of the tooth be obtained. Still another object is in the provision of a tooth assembly as described above wherein take-up means are incorporated so that the tooth can be readily tightened upon its mounting in the event that wear of either the tooth or mounting horn cause a loosening of the tooth. Yet another object is in providing a tooth and mounting horn therefor wherein the weight of the tooth is relatively low and the ratio of wearable metal weight to the total weight of the tooth is relatively high.

A further object of the invention is to provide a tooth and mounting horn therefor wherein tapered complementary surfaces are provided that enable the tooth to be drawn tightly upon the horn irrespective of some difference in the width of the surfaces from a standard. Still a further object is to provide a tooth assembly in which the end surface of the tooth is spaced slightly from the forward surface of the mounting horn at initial installation so that the tooth can be drawn rearwardly upon the horn to take up any wear that may occur during use of the assembly. Yet a further object is to provide a tooth assembly for dragline buckets and the like wherein the mounting horn is provided with a pair of spaced-apart wedge-shaped fingers that are receivable within a V-shaped recess provided in the tooth, the tooth being equipped with an eyebolt and the mounting horn being provided with an opening therethrough that receives the eyebolt. Additional objects and advantages will appear as the specification proceeds.

An embodiment of the invention is illustrated in the accompanying drawing, in which—

Fig. 1 is a perspective view of a dragline bucket having the tooth assembly of my invention incorporated therein; Fig. 2 is a perspective view of the tooth; Fig. 3 is a top view in plan of the lip of a dragline bucket and in which one tooth is shown in plan, another tooth and the mounting horn therefor are shown in section, and wherein the remaining teeth are removed to show just the mounting horn; Fig. 4 is a longitudinal sectional view taken on the line 4—4 of Fig. 3; and Fig. 5 is a transverse sectional view taken on the line 5—5 of Fig. 3.

A dragline bucket is illustrated in Fig. 1 and is designated generally with the numeral 10. It will be understood that the dragline bucket is simply exemplary of a type of bucket with which the tooth of my invention may be used, and that the invention is equally applicable to dippers, back hoes, and similar structures. The bucket 10 is generally conventional and includes side walls 11 and 12, a rear wall 13, and a bottom wall 14. The forward end of the bucket is open so that it can receive therein and discharge therefrom a quantity of material being worked by the bucket.

An arch 15 extends above the bucket adjacent the forward open end thereof and is secured to the side walls 11 and 12 and provides a connector 16 to which a dump line may be secured. The side walls also have rigidly mounted thereon trunnions 17 to which the hoist chains may be secured and the side walls provide along their forward edges connectors 18 to which the draglines may be secured. The bucket 10 is also seen to be equipped with a lip 19 having mounted thereon in spaced-apart relation a plurality of mounting members or horns 20 to which the teeth or points 21 are secured.

As can be seen best in Figs. 3 and 4, the lip 19 is provided along the rear edge thereof with a plurality of spaced-apart apertures 22 therethrough that enable the lip to be removably secured to the bottom wall 14 of the bucket. It will be appreciated, however, that the lip 19 may be otherwise secured to the bucket and may, for example, be welded thereon or, without affecting the invention herein disclosed, the lip might be an integral part of the bottom wall 14 of the bucket.

A plurality of mounting members or horns, as they are generally referred to, are rightly secured to the forward edge of the lip 19 as is shown in Figs. 1 and 3. Any number of horns may be provided and the particular number may vary with the size or capacity of the bucket. Each of the horns 20 provide a pair of spaced-apart rearwardly-extending ribs 23 that are rigidly secured to the lip 19 and that provide therebetween a panelled recess 24. At their forward ends, the ribs 23 are formed integrally with a forwardly- and upwardly-inclined backing wall 25 which is provided with a tapered bore 26 therethrough. Preferably, the bore 26 is frustoconical in shape with the largest diameter thereof at the forward side of the wall 25. As is shown best in Figs. 4 and 5, the bore 26 is angled slightly relative to the plane 27 of the wall 25 and extends upwardly at its rear end portion and downwardly at the forward end portion. The purpose of this is to permit easy insertion of the eyebolt which will be subsequently described. The horns may be secured to the lip in any suitable manner and may be cast integrally therewith, or separate bases as an alternative to integrally cast bases on the lip can be welded or bolted to a plain cast or plate lip.

Projecting forwardly and downwardly from the wall 25 are a pair of spaced-apart wedges or wedge-shaped fingers 28. The fingers 28 have upper and lower walls that converge forwardly toward a point and enlarge rearwardly. Preferably, the wedges 28 are formed integrally with the wall 25 and ribs 23. As is shown best in Fig. 3, the wedges 28 lie forwardly of the lip 19. Interposed between the wedges or fingers 28 and which is a part of the wall 25, is an arcuate wall portion 29.

The teeth or points 21 are generally wedge-shaped and have an upper wall 30 and lower wall or surface 31 that converge forwardly toward the tip 32. At its rear portion the tooth 21 has a V-shaped channel or recess 33 therein that extends substantially from one side to the other of the tooth but which has interposed between the ends thereof a pair of spaced-apart webs 34, each of which is provided with an aperture 35 therethrough. The apertures 35 in each web 34 are aligned and are adapted to receive therein pin 36, as is seen in Figs. 4 and 5. The pin 36 is also adapted to extend through the eye portion 37 of an eyebolt 38 which has an elongated shank 39 that extends through the bore 26 and is threaded at its rear end to receive a nut 40 thereon. The eye 37 of the bolt is pivotally received within the channel 41 provided between the webs 34. In a similar manner, the wedges 28 are spaced apart by a sufficient gap so as to receive therebetween the webs 34 of the tooth 21.

It will be apparent that the angular disposition of the walls or surfaces 42 and 43 of the tooth 21 is complementary to the angular disposition of the surfaces 44 and 45 provided by the wedges 28. Therefore, the tooth 21 may be placed upon the wedges 28 of the horn and upon tightening of the nut 40 the tooth is drawn rearwardly until the complementary surfaces 42 and 44 and 43 and 45, respectively, are brought into tight abutting relation. When in such position the tooth 21 is firmly and rigidly secured to the horn 20.

With this arrangement it is not essential that the tapering width of the wedges 28 and, similarly, the tapering cross-section of the recesses 33, be accurately related to a standard for any difference in widths may be taken up by simply drawing the tooth 21 tightly onto the horn 20. Nevertheless, as is seen best in Figs. 4 and 5, the dimensions of the wedges 28 and recess 33 are selected so that upon initial mounting of the tooth upon the horn the rear arcuate edges 46 and 47 of the tooth 21 are spaced slightly from the forward edges 48 and 49 of the horn wall 25. Preferably, the gap 50 therebetween is in the order of about one-half inch. Therefore, if the cross-section of the wedges 28 is too small, the tooth may be drawn rearwardly and partially closing the gap 50a occurring between the pointed end of horn 20 and the horn-receiving recess of point 21 until the complementary surfaces abut and the tooth is then rigidly secured to the horn. If, in use of the assembly, the complementary surfaces wear slightly and the tooth becomes loose upon the horn, the nut 40 is simply tightened to draw the tooth rearwardly and again tighten it upon the horn.

It will be noted that the webs 34 have arcuate rear surfaces 51 which are complementary to the arcuate surface 29 of the wall 25.

It has been brought out that the bore 26 angles upwardly and rearwardly and the reason for this is to provide sufficient access so that practically any type of wrench can be placed upon the nut 40 to tighten the same without making the panel recess 24 excessively deep. Thus there is no unnecessary weakening of the horn structure to permit a wrench to be manipulated for tightening the tooth upon the horn.

Operation

Preferably the horns 20 are formed integrally with a lip 19 or, as has been hereinbefore brought out, may be formed on separate bases welded or bolted to the lip, and the lip may be removably secured to a dragline bucket 10 or other similar structure. A tooth 21 is then provided for each horn and each tooth is equipped with an eyebolt 38 by means of the pin 36 which extends through the eye 37 and through the apertures 35 in the webs 34. The eyebolt 38 is then inserted through the bore 26 and the enlarged forward end portion of the bore permits easy and ready insertion of the bolt therethrough. A nut 40 is threaded onto the end of the eyebolt 38 and a wrench is applied to the nut to tighten the same, wherein the tooth 21 is drawn rearwardly and onto the wedges 28 where a very rigid and stable anchoring of the tooth is afforded. If after the assembly has been in use for some time it is necessary to take up for any wearing of the tooth and horn surfaces, the nut 40 is tightened further onto the shank of the eyebolt and the tooth is drawn rearwardly to again provide a secure mounting therefor. If the tooth should be replaced, the nut 40 is simply loosened and the tooth withdrawn from its mounting upon the wedges 28.

The teeth 21 do not have heavy shanks and, as will be appreciated, the weight of wearable metal is great compared to the total metal in the tooth. Further, the initial weight of the tooth is relatively low since a shank is unnecessary and since the recess 33 eliminates a substantial portion of metal.

As long as the angle of the wedge faces 44 and 45 is constant and the angle of the recess faces 42 and 43 is constant, variation in width of these members is not critical for the tooth may be moved forwardly and rearwardly upon the horn to compensate for any change in width and such permissible variation in positioning allows for less critical manufacturing tolerances and reduces the cost appreciably. Further, the large number of tapered keys that have been required in prior art structures, all of which have been provided in different widths to permit some variation in tooth dimensions, is now avoided and stocks of such keys are no longer required.

While in the foregoing specification and embodiment of the invention has been illustrated and described in considerable detail for purposes of illustration, it will be apparent to those skilled in the art that considerable deviation from these details may be made without departing from the spirit and principles of the invention.

I claim:

1. In a structure of the character described, a mounting horn equipped with a pair of spaced-apart, forwardly-extending wedges having a substantially constant angle of taper, said mounting horn providing a bore therethrough opening between said wedges, a tooth having a recess in the rear portion thereof with tapering walls substantially complementary to the tapering walls of said wedges and having substantially the same constant angle of taper, said tooth being equipped with a pair of spaced-apart webs received between said wedges, and eyebolt means carried between said webs and extending through said bore for anchoring said tooth upon said mounting horn, said rear portion of said tooth and said webs providing abutment surfaces and said horn having facing abutment surfaces normally spaced therefrom, said mounting horn being provided with an arcuate surface between said wedges providing at least one of said facing abutment surfaces, the rear walls of said webs being arcuate.

2. The structure of claim 1, wherein said bore is frusto-conical in shape and is enlarged at the forward end thereof.

3. The structure of claim 2, wherein said frusto-conical bore is inclined upwardly and rearwardly and terminates between a pair of rearwardly-extending ribs provided by said mounting horn.

4. A tooth structure adapted for mounting on a horn equipped with forwardly-extending wedges provided with a substantially constant angle of taper and having a bore therethrough for receiving a bolt, comprising a tooth having relatively inclined walls tapering forwardly toward a point, said tooth being provided with a generally V-shaped recess with the walls thereof converging toward the point of said tooth at substantially the same constant angle of taper as the angle of taper of said forwardly-extending wedges and being adapted to receive said wedges therein, and a pair of spaced-apart webs mounted within said recess and being adapted to pivotally receive a bolt therebetween, said webs providing a surface of abutment adapted to be positioned in facing, normally-spaced relation with said horn.

5. The structure of claim 4, in which said webs are provided with aligned apertures therethrough, a pin being carried in said apertures, and an eyebolt being pivotally mounted upon said pin.

References Cited in the file of this patent

UNITED STATES PATENTS

| | | |
|---|---|---|
| 1,449,556 | Seaholm | Mar. 27, 1923 |
| 1,872,307 | Lehman | Aug. 16, 1932 |
| 2,311,463 | Page | Feb. 16, 1943 |
| 2,385,395 | Baer | Sept. 25, 1945 |